United States Patent [19]

Agano

[11] Patent Number: 4,661,708
[45] Date of Patent: Apr. 28, 1987

[54] RADIATION IMAGE READ-OUT APPARATUS

[75] Inventor: Toshitaka Agano, Kanagawa, Japan

[73] Assignee: Fuji Photo Film Co., Ltd., Kanagawa, Japan

[21] Appl. No.: 782,819

[22] Filed: Oct. 2, 1985

[30] Foreign Application Priority Data

Oct. 3, 1984 [JP] Japan .................................. 59-207877

[51] Int. Cl.$^4$ ............................................. G03C 5/16
[52] U.S. Cl. .............................. 250/327.2; 250/484.1
[58] Field of Search .................. 250/327.2, 484.1, 347, 250/348

[56] References Cited

U.S. PATENT DOCUMENTS 4,346,295  8/1982  Tanaka et al. .................... 250/327.2

*Primary Examiner*—Carolyn E. Fields
*Attorney, Agent, or Firm*—Sughrue, Mion, Zinn, Macpeak and Seas

[57] ABSTRACT

A radiation image read-out apparatus comprises a stimulating ray adjustment unit comprising a device for increasing the beam diameter of stimulating rays on the surface of a stimulable phosphor sheet, a device for decreasing the intensity of stimulating rays, and a device for changing the optical path of stimulating rays. The stimulating ray adjustment unit is moveable between a position for acting on stimulating rays and a position for not acting thereon. A reflection mirror for reflecting light emitted by the stimulable phosphor sheet when it is exposed to stimulating rays is positioned facing a light guide member for movement in such a direction that the distance between the reflection mirror and the light guide member changes. The movement of the stimulating ray adjustment unit to the position for acting on stimulating rays and the movement of the reflection mirror for increasing the distance are interlocked with each other.

4 Claims, 5 Drawing Figures

RADIATION IMAGE READ-OUT APPARATUS

BACKGROUND OF THE INVENTION

1. Field of the Invention

This invention relates to a radiation image read-out apparatus used in a radiation image recording and reproducing system.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

One embodiment of the aforesaid radiation image recording and reproducing system is disclosed, for example, in Japanese Unexamined Patent Publication No. 58(1983)-67243. In the embodiment, before final read-out for scanning the stimulable phosphor sheet carrying a radiation image of an object stored therein by stimulating rays which cause the stimulable phosphor sheet to emit light in proportion to the radiation energy stored, detecting the emitted light by a photoelectric read-out means and converting it into an electric image signal is conducted, preliminary read-out for approximately detecting the image information stored in the stimulable phosphor sheet is conducted by use of stimulating rays of a level lower than the level of the stimulating rays used in the final read-out. Read-out conditions for the final read-out are adjusted on the basis of the information obtained by the preliminary read-out, and the final read-out is conducted by use of the read-out conditions.

FIG. 4 is a perspective view showing an example of the conventional read-out apparatus used in the aforesaid radiation image recording and reproducing system, wherein the read-out apparatus for the final read-out may be used also for the preliminary read-out.

In FIG. 4, preliminary read-out is first conducted on a stimulable phosphor sheet carrying a radiation image stored therein. A laser beam 3 emitted by a laser beam source 2 is passed through a beam expander 4, and the beam diameter of the laser beam 3 is strictly adjusted. Then, the laser beam 3 is passed through an ND filter 5, a prism 6 and a concave lens 7 to reduce the strength of the laser beam 3 and increase the beam diameter thereof. Also, the optical path is shifted away from a light input face of a light guide member 12 so that a part of the expanded laser beam is not intercepted by the light guide member 12. Then, the laser beam 3 is one-dimensionally deflected by a light deflector 8 constituted by a galvanometer mirror or the like and is made to impinge upon a stimulable phosphor sheet 1 by a plane reflection mirror 9. Between the light deflector 8 and the plane reflection mirror 9 is positioned an fθ lens 10 for maintaining the beam diameter of the laser beam 3 uniform during the scanning of the laser beam 3 on the sheet 1. While the laser beam 3 impinges upon the stimulable phosphor sheet 1, the sheet 1 is moved in the direction as indicated by the arrow 11 (sub-scanning direction) and, consequently, the whole area of the sheet 1 is exposed to and scanned by the laser beam 3. The power of the laser beam source 2, the beam diameter of the laser beam 3, the scanning speed of the laser beam 3, and the moving speed of the stimulable phosphor sheet 1 are selected so that the stimulation energy of the laser beam 3 for the preliminary read-out is smaller than the stimulation energy of the laser beam for the final read-out. When exposed to the laser beam 3, the stimulable phosphor sheet 1 emits light in proportion to the stored radiation energy, and the emitted light enters the light guide member 12. The light guide member 12 has a linear light input face positioned close to the scanning line on the stimulable phosphor sheet 1, and a ring-shaped light output face in close contact with the light receiving face of a photodetector 13, which may be a photomultiplier. The light guide member 12 is fabricated of a transparent thermoplastic resin sheet such as an acrylic resin sheet so that the light entering from the light input face can be transmitted to the light output face by total reflection inside of the light guide member 12. The light emitted by the stimulable phosphor sheet 1 upon stimulation thereof is guided inside of the light guide member 12, emitted from the light output face of the light guide member 12 and received by the photodetector 13. The light guide member 12 may be of a shape and a material as disclosed in U.S. Pat. No. 4,346,295.

The light receiving face of the photodetector 13 is provided with a filter (not shown) for transmitting only the light having the wavelength distribution of the light emitted by the stimulable phosphor sheet 1 and cutting off the light having the wavelength distribution of the stimulating rays, so that the photodetector 13 can detect only the light emitted by the stimulable phosphor sheet 1 upon stimulation thereof. The output of the photodetector 13 is sent to an amplifier 15 for the preliminary read-out via a switch 14 and is amplified thereby. The image information generated by the amplifier 15 is sent to a control circuit 16.

On the basis of the image information thus obtained, the control circuit 16 adjusts an amplification degree setting value (a) and a scale factor setting value (b) used as final read-out conditions, and an image processing condition setting value (c).

When the preliminary read-out is finished, the stimulable phosphor sheet 1 is returned to the read-out starting position 17 by a reverse rotation of a sub-scanning motor (not shown), and then the final read-out is started. In the final read-out, the laser beam 3 is emitted by the laser beam source 2 in the same manner as in the preliminary read-out. However, in the final read-out, the ND filter 5, the prism 6 and the concave lens 7 are moved away from the optical path in the direction as indicated by the arrow 18. Therefore, after the beam diameter of the laser beam 3 is strictly adjusted by the beam expander 4, the laser beam 3 directly reaches the light deflector 8 constituted by a galvanometer mirror or the like, is one-dimensionally deflected thereby, and is made to impinge upon the sheet 1 via the plane reflection mirror 9. The $f\theta$ lens 10 again maintains the scanning speed of the laser beam 3 constant during the scanning of the laser beam 3 on the sheet 1. While the laser beam 3 impinges upon the stimulable phosphor sheet 1, the sheet 1 is moved at a predetermined speed in the direction as indicated by the arrow 11 (sub-scanning direction) and consequently the whole area of the sheet 1 is exposed to the laser beam 3. Upon exposure to the laser beam 3, the stimulable phosphor sheet 1 emits light in proportion to the stored radiation energy. The emitted light enters the light guide member 12 and is detected by the photodetector 13 in the same manner as in the preliminary read-out. The output of the photodetector 13 is sent through the switch 14 to a final read-out amplifier 19 the sensitivity of which has been adjusted by the amplification degree setting value (a), and amplified to an appropriate level. The amplified electric signal is sent to an A/D converter 20, in which it is converted to a digital signal by use of a scale factor which has been adjusted by the scale factor setting value (b) to suit the width of signal fluctuation. The digital signal thus obtained is sent to the signal processing circuit 21, in which it is processed based on the image processing condition setting value (c) so as to obtain a radiation image suitable for viewing, particularly for diagnostic purposes. The signal is then sent to an image reproducing apparatus for reproducing a visible radiation image.

FIG. 5 is a perspective view showing a reflection mirror section at which a reflection mirror is positioned facing the light guide member in the read-out apparatus of FIG. 4. The light emitted by the stimulable phosphor sheet when it is exposed to stimulating rays is non-directional and weak. Therefore, as shown in FIG. 5, in order to improve the light guiding efficiency, it has been proposed in U.S. Pat. No. 4,346,295 to position a reflection mirror 38 on the side opposite to the light input face of the light guide member 12 with respect to the scanning line on the stimulable phosphor sheet 1. The reflection surface of the reflection mirror 38 stands face to face with the light input face of the light guide member 12, and has a length approximately equal to the length of the light input face.

However, in order to improve the light guiding efficiency as much as possible, the reflection mirror 38 is positioned as close to the light input face of the light guide membet 12 as possible, for example, at a spacing of t=1 mm from the light input face. Therefore, when the beam diameter of the stimulating rays 3 is increased for the preliminary read-out and the optical path is shifted as described above, there arises the problem that the stimulating rays 3 are intercepted by the reflection mirror.

SUMMARY OF THE INVENTION

The primary object of the present invention is to provide a radiation image read-out apparatus which is provided with a reflection mirror for improving the light guiding efficiency during final read-out, and conducts preliminary read-out smoothly.

Another object of the present invention is to provide a radiation image read-out apparatus which is easily switched between preliminary read-out and final read-out.

The present invention provides a radiation image read-out apparatus provided with a stimulating ray source for emitting stimulating rays for scanning a stimulable phosphor sheet carrying a radiation image stored therein, a photoelectric read-out means for photoelectrically detecting light emitted by the stimulable phosphor sheet during scanning by the stimulating rays, and a reflection mirror for reflecting the emitted light towards the photoelectric read-out means, wherein the improvement comprises the provision of: a stimulating ray adjustment means which comprises a beam diameter increasing means for increasing the beam diameter of said stimulating rays on the surface of said stimulable phosphor sheet by acting on the beam of said stimulating rays, a light intensity decreasing means for decreasing the intensity of said stimulating rays by acting on the beam of said stimulating rays, and an optical path changing means for changing the optical path of said stimulating rays by acting on the beam of said stimulating rays, said stimulating ray adjustment means being moveable between a position for acting on the beam of said stimulating rays and a position for not acting thereon, said reflection mirror being moveable in such a direction that the distance between said reflection mirror and said photoelectric read-out means changes, the movement of said stimulating ray adjustment means to the position for acting on the beam of said stimulating rays being interlocked with the movement of said reflection mirror in such a direction that said distance is increased.

In the radiation image read-out apparatus of the present invention, when the condition of the stimulating rays and the position of the reflection mirror are adjusted for the final read-out, the apparatus may be used for the final read-out by moving the stimulating ray adjustment means to the position at which the stimulating ray adjustment means does not act on the stimulating rays. The apparatus may also be used for the preliminary read-out by moving the stimulating ray adjustment means to the position at which it acts on the stimulating rays and by moving the reflection mirror in such a direction that the distance between the reflection mirror and the photoelectric read-out means is increased.

Thus the radiation image read-out apparatus of the present invention is adapted for conducting both the final read-out and the preliminary read-out and may be switched very easily between the final read-out and the preliminary read-out by mechanical movement of the stimulating ray adjustment means and the mechanical interlocked movement of the stimulating ray adjustment means and the reflection mirror.

DESCRIPTION OF THE PREFERRED EMBODIMENTS

The present invention will hereinbelow be described in further detail with reference to the accompanying drawings.

Figure 1:
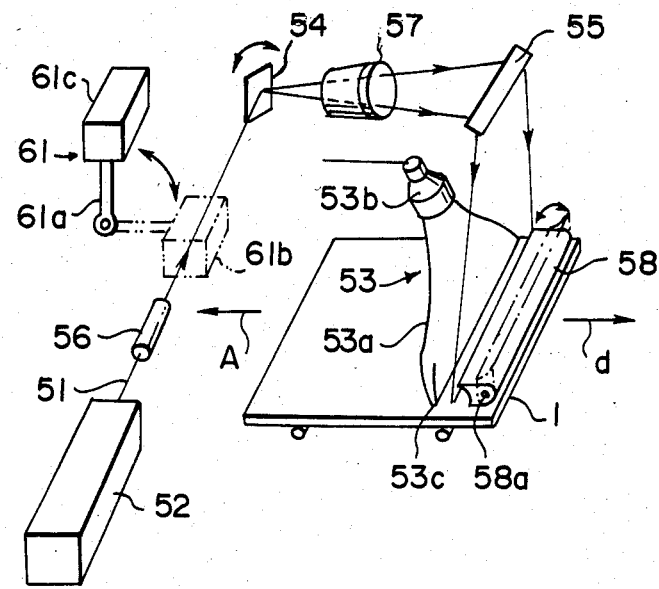
FIG. 1 is a perspective view showing an embodiment of the radiation image read-out apparatus in accordance with the present invention.

FIG. 1 shows an embodiment of the radiation image read-out apparatus in accordance with the present invention. As in the read-out apparatus of FIG. 4, the apparatus of FIG. 1 is provided with a stimulating ray source 52 for emitting stimulating rays 51 used for scanning a stimulable phosphor sheet 1, a photoelectric read-out means 53 for photoelectrically detecting light emitted by the sheet 1 when it is exposed to the stimulating rays 51, and a reflection mirror 58 for reflecting the emitted light towards the photoelectric read-out means 53, particularly towards a light input face 53c of a light guide member 53a of the photoelectric read-out means 53. The photoelectric read-out means 53 is constituted by the light guide member 53a and a photodetector 53b. Reference numerals 54, 55, 56 and 57 respectively denote a light deflector such as a galvanometer mirror, a plane reflection mirror, a beam expander, and an fθ lens. The apparatus shown is adjusted for the final read-out. Details and actions of these elements are the same as described with reference to FIG. 4 and are disclosed in Japanese Unexamined Patent Publication No. 58(1983)-67243. Therefore, only the characteristic parts of the embodiment of FIG. 1 will hereinbelow be described.

The apparatus of FIG. 1 is provided with a stimulating ray adjustment means 61 moveable between a position at which the means 61 acts on the beam of stimulating rays 51 and a position at which it does not act thereon. The reflection mirror 58 is moveable in such a direction that the distance between the reflection mirror 58 and the photoelectric read-out means 53, particularly the light guide member 53a thereof, is changed. The movement of the stimulating ray adjustment means 61 to the position for acting on the beam of the stimulating rays 51 and the movement of the reflection mirror 58 in such a direction that the aforesaid distance is increased are interlocked with each other. The stimulating ray adjustment means 61 is constituted by a beam diameter increasing means 62 for increasing the beam diameter of the stimulating rays 51 on the surface of the stimulable phosphor sheet 1 by acting on the beam of the stimulating rays 51, a light intensity decreasing means 63 for decreasing the intensity of the stimulating rays 51 by acting thereon, and an optical path changing means 64 for changing the optical path of the stimulating rays 51 by acting thereon. (The means 62, 63 and 64 are not shown in FIG. 1.)

Figure 2:
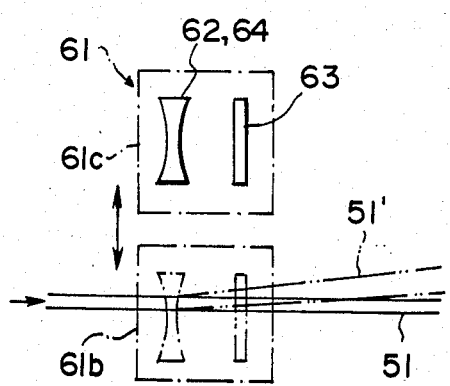
FIG. 2 is a conceptual view showing an example of the stimulating ray adjustment means in FIG. 1.

In this embodiment, as shown in FIG. 2, the beam diameter increasing means 62 and the optical path changing means 64 are constituted by a single concave lens, and the light intensity decreasing means 63 is constituted by an ND filter.

The beam diameter increasing means 62 may be any means insofar as it increases the beam diameter on the stimulable phosphor sheet 1 to a predetermined diameter, e.g. approximately 3 mm, and may be constituted by a convex lens. The beam of the stimulating rays 51 is focused on the surface of the stimulable phosphor sheet 1 for the final read-out and is adjusted to be converged thereon. Therefore, when the convex lens acts on the beam of the stimulating rays 51, the beam is converged prior to the surface of the sheet 1 and is expanded on the sheet surface.

Figure 3:
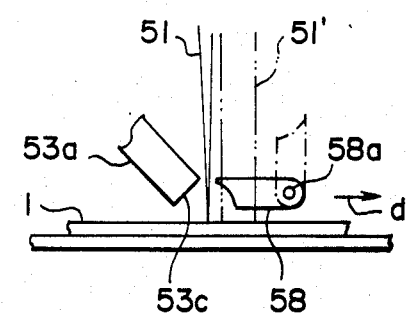
FIG. 3 is a side view showing the relationship between the reflection mirror and stimulating rays.
Figure 4:
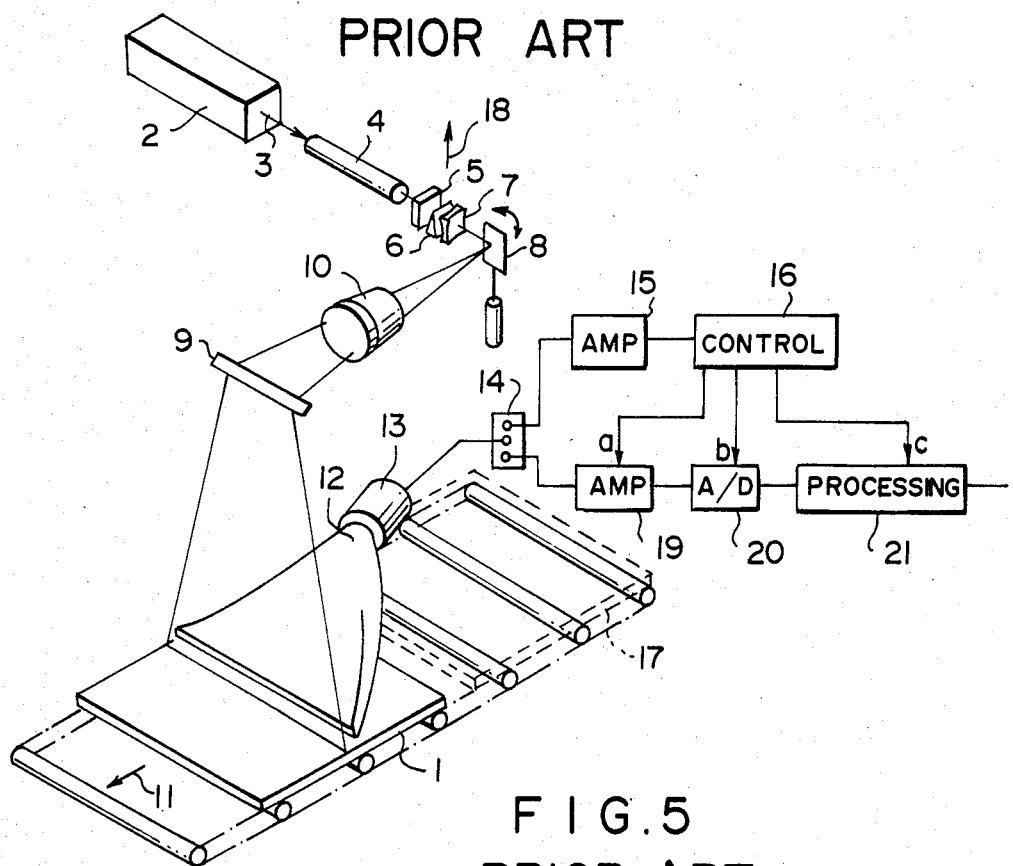
FIG. 4 is a perspective view showing an example of the conventional radiation image read-out apparatus.
Figure 5:
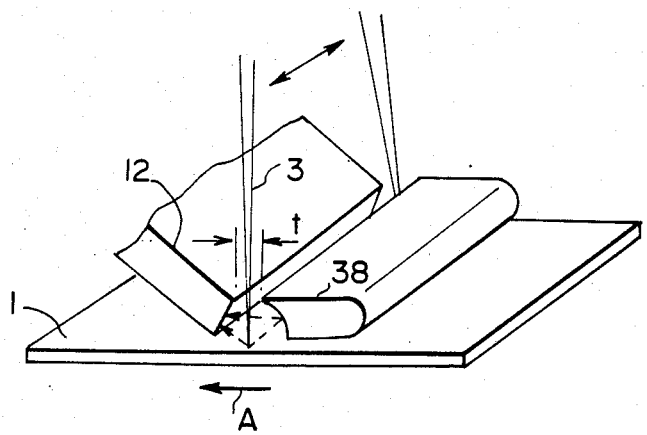
FIG. 5 is a perspective view showing a reflection mirror section at which a reflection mirror is positioned facing the light guide member in the apparatus of FIG. 4.

In the case where the optical path of the stimulating rays 51 remains unchanged when the reflection mirror 58 is moved to increase the distance between the reflection mirror 58 and the light guide member 53a, there arises the problem that a part of the expanded beam of the stimulating rays 51 is intercepted by the light guide member 53a. In order to eliminate the problem, as shown in FIG. 3, the optical path changing means 64 is used to shift the beam of stimulating rays 51' for the preliminary read-out slightly towards the reflection mirror 58. In this embodiment, the optical path of the stimulating rays is changed as indicated by the two-dotted chain line in FIG. 2 by making the beam of the stimulating rays pass through a portion of the concave lens slightly deviated from the center thereof. However, the optical path may be changed in the same manner by using a convex lens. Also, a prism may be used as shown in FIG. 4.

The light intensity decreasing means 63 is used to decrease the intensity of the stimulating rays adjusted for the final read-out and to decrease the stimulation energy of the stimulating rays for use in the preliminary read-out together with the beam diameter increasing means 62. As the light intensity decreasing means 63, it is also possible to use an element other than the ND filter.

As shown in FIGS. 1 and 2, the stimulating ray adjustment means 61 comprising the means 62, 63 and 64 combined integrally with each other is positioned between the beam expander 56 and the light deflector 54 for rotation by a moving means such as a rotation arm 61a between a position 61b at which the means 61 acts on the stimulating rays and a position 61c at which the means 61 does not act thereon. The means 62, 63 and 64 need not necessarily be combined integrally with each other or be positioned at the same position, and the moving means need not necessarily be of a single element. However, movements of the means 62, 63 and 64 should preferably be synchronized with each other.

Though the reflection mirror 58 is constructed for rotation around a shaft 58a, it may be constituted in any other manners insofar as it is moveable to increase the distance between itself and the light guide member 53a so that the stimulating rays having an increased beam diameter impinge upon the stimulable phosphor sheet 1 without being intercepted. For example, the reflection mirror 58 may also be constructed for parallel movement in the direction as indicated by the arrow d.

The movement of the stimulating ray adjustment means 61 to the position for acting on the beam of the stimulating rays and the movement of the reflection mirror 58 in the distance-increasing direction are interlocked with each other, for example, by use of the same drive source (not shown) so that the movements are conducted in synchronization with each other. This is because the preliminary read-out cannot be conducted only with one of these movements.

In the aforesaid radiation image read-out apparatus, the preliminary read-out is first conducted by moving the stimulable phosphor sheet 1 in the direction as indicated by the arrow A. On the basis of the image information obtained by the preliminary read-out, the final read-out conditions and the like are adjusted. Then, the stimulable phosphor sheet 1 is moved reversely to the read-out starting position, the read-out apparatus is switched to the final read-out, and the final read-out is conducted by moving the sheet 1 in the direction as indicated by the arrow A. The final read-out is conducted based on the adjusted final read-out conditions.

I claim:

1. A radiation image read-out apparatus provided with a stimulating ray source for emitting stimulating rays for scanning a stimulable phosphor sheet carrying a radiation image stored therein, a photoelectric read-out means for photoelectrically detecting light emitted by the stimulable phosphor sheet during scanning by the stimulating rays, and a reflection mirror for reflecting the emitted light towards the photoelectric read-out means, wherein the improvement comprises the provision of: a stimulating ray adjustment means which comprises a beam diameter increasing means for increasing the beam diameter of said stimulating rays on the surface of said stimulable phosphor sheet by acting on the beam of said stimulating rays, a light intensity decreasing means for decreasing the intensity of said stimulating rays by acting on the beam of said stimulating rays, and an optical path changing means for changing the optical path of said stimulating rays by acting on the beam of said stimulating rays, said stimulating ray adjustment means being moveable between a position for acting on the beam of said stimulating rays and a position for not acting thereon, said reflection mirror being moveable in such a direction that the distance between said reflection mirror and said photoelectric read-out means changes, the movement of said stimulating ray adjustment means to the position for acting on the beam of said stimulating rays being interlocked with the movement of said reflection mirror in such a direction that said distance is increased.

2. An apparatus as defined in claim 1 wherein said beam diameter increasing means and said optical path changing means are constituted by a single concave lens.

3. An apparatus as defined in claim 1 wherein said light intensity decreasing means is constituted by an ND filter.

4. An apparatus as defined in claim 1 wherein said stimulating ray adjustment means is rotatable around a rotation axis between said position for acting on the beam of said stimulating rays and the position for not acting thereon.

* * * * *